United States Patent
Luber

(10) Patent No.: US 8,115,832 B2
(45) Date of Patent: Feb. 14, 2012

(54) ZOOM SYSTEM FOR AN OPTICAL STEREO DEVICE

(75) Inventor: Joachim Luber, Margrethen (CH)

(73) Assignee: Swiss Medical Technology GmbH, Widnau (CH)

( * ) Notice: Subject to any disclaimer, the term of this patent is extended or adjusted under 35 U.S.C. 154(b) by 70 days.

(21) Appl. No.: 12/739,493

(22) PCT Filed: Oct. 17, 2008

(86) PCT No.: PCT/EP2008/008802
§ 371 (c)(1),
(2), (4) Date: Jun. 4, 2010

(87) PCT Pub. No.: WO2009/052999
PCT Pub. Date: Apr. 30, 2009

(65) Prior Publication Data
US 2010/0238326 A1    Sep. 23, 2010

Related U.S. Application Data

(60) Provisional application No. 60/982,298, filed on Oct. 24, 2007.

(30) Foreign Application Priority Data

Oct. 24, 2007    (EP) .................................... 07020831

(51) Int. Cl.
*H04N 5/262* (2006.01)
*G03B 3/00* (2006.01)
*G02B 27/22* (2006.01)

(52) U.S. Cl. .................. 348/240.3; 359/462; 396/85

(58) Field of Classification Search ............... 348/42, 348/46, 47, 49, 240.99, 240.3, 340; 396/72, 396/76–83, 85–87, 324–331; 359/462; 352/57, 352/60
See application file for complete search history.

(56) References Cited

U.S. PATENT DOCUMENTS 3,851,952 A * 12/1974 Werz et al. .................. 359/706
4,751,570 A *  6/1988 Robinson ..................... 348/47
(Continued)

FOREIGN PATENT DOCUMENTS

DE            43 15 630        11/1994
(Continued)

*Primary Examiner* — Timothy J Henn
(74) *Attorney, Agent, or Firm* — McDonell Boehnen Hulbert & Berghoff LLP

(57) ABSTRACT

A zoom system (10) for an optical stereo device is provided. The zoom system (10) comprises a front plate (30) and a lens plate (60) disposed in a fixed spatial relationship and defining two optical paths within the zoom system (10). The zoom system further comprises a zoom plate (40) having two lens assemblies (45a, 45b), wherein the zoom plate (40) is disposed between the front plate (30) and the lens plate (60), and a compensation plate (50), wherein the compensation plate (50) is disposed between the zoom plate (40) and the lens plate (60). The zoom system further comprises a drive spindle (20) having a helical groove and a cam disk portion for simultaneously adjusting the position of the zoom plate (40) and the compensation plate (50) relative to the front plate (30) and the lens plate (60) in a coordinated manner, wherein the position of the zoom plate (40) is adjusted by means of the helical groove and the position of the compensation plate is adjusted by means of the cam disk portion of the drive spindle (20).

15 Claims, 6 Drawing Sheets

U.S. PATENT DOCUMENTS

| | | | | |
|---|---|---|---|---|
| 4,999,713 | A * | 3/1991 | Ueno et al. | 348/240.3 |
| 5,675,442 | A * | 10/1997 | Parks | 359/701 |
| 5,776,049 | A * | 7/1998 | Takahashi | 600/111 |
| 7,133,200 | B2 * | 11/2006 | Hengst et al. | 359/410 |
| 2007/0268576 | A1 * | 11/2007 | Lee | 359/407 |
| 2009/0096865 | A1 * | 4/2009 | McKinley | 348/45 |
| 2009/0315808 | A1 * | 12/2009 | Ishii | 345/1.3 |
| 2010/0321777 | A1 * | 12/2010 | Martinez et al. | 359/465 |

FOREIGN PATENT DOCUMENTS

| | | |
|---|---|---|
| DE | 195 41 237 | 5/1996 |
| DE | 198 22 256 | 12/1999 |
| WO | 03/016978 | 2/2003 |

* cited by examiner

ZOOM SYSTEM FOR AN OPTICAL STEREO DEVICE

TECHNICAL FIELD OF THE INVENTION

The invention relates to a zoom system for an optical stereo device and in particular to a zoom system for a stereo microscope system or a stereo camera to be employed by medical professionals and especially dentists and surgeons.

BACKGROUND OF THE INVENTION

In the medical field it is becoming more and more common practice to use stereo microscopes or cameras for assisting medical professionals in performing such tasks as medical surgeries, examinations, treatments and the like. Typically these optical devices provide for the possibility of zooming into a picture by means of a so-called pancreatic lens system. During zooming, some lenses of the pancreatic lens system are moved and must be brought into certain positions in relation to other fixed lenses with extraordinary precision in order to provide for a good image. Conventionally an annular cam disk milled with great care has been used to control the position of these lenses and thereby the overall quality of the optical device. A drawback of these conventional configurations is that the annular cam disk completely surrounds the optical system and the lenses thereof so that these elements are not readily accessible. Furthermore, the conventional systems leave virtually no space for installing additional components, such as control, drive and power supply units, resulting in rather bulky optical devices.

The object of the present invention is to provide for a zoom system for an optical stereo device overcoming or at least mitigating the problems associated with the above described conventional zoom systems.

SUMMARY OF THE INVENTION

The above object is achieved by a zoom system for an optical stereo device according to claim 1. The zoom system according to the present invention comprises a front plate having two lens assemblies and a lens plate having two lens assemblies. The front plate and the lens plate are disposed in a fixed spatial relationship and define two optical paths within the zoom system. The zoom system comprises further a zoom plate having two lens assemblies, wherein the zoom plate is disposed between the front plate and the lens plate, and a compensation plate having two lens assemblies, wherein the compensation plate is disposed between the zoom plate and the lens plate. The zoom system comprises further a drive spindle having a helical groove and a cam disk portion for simultaneously adjusting the position of the zoom plate and the compensation plate relative to the front plate and the lens plate in a coordinated manner. The position of the zoom plate is adjusted by means of the helical groove and the position of the compensation plate is adjusted by means of the cam disk portion of the drive spindle.

The zoom system according to the present invention provides for the advantage that the zoom system can be more easily gauged, because substantially each component thereof is readily accessible. Furthermore, control, drive and power supply units can be readily arranged within the zoom system itself, which, in turn, allows for the provision of smaller optical devices.

Further preferred beneficial embodiments are defined in the sub-claims.

DETAILED DESCRIPTION OF PREFERRED EMBODIMENTS

Figure 1:
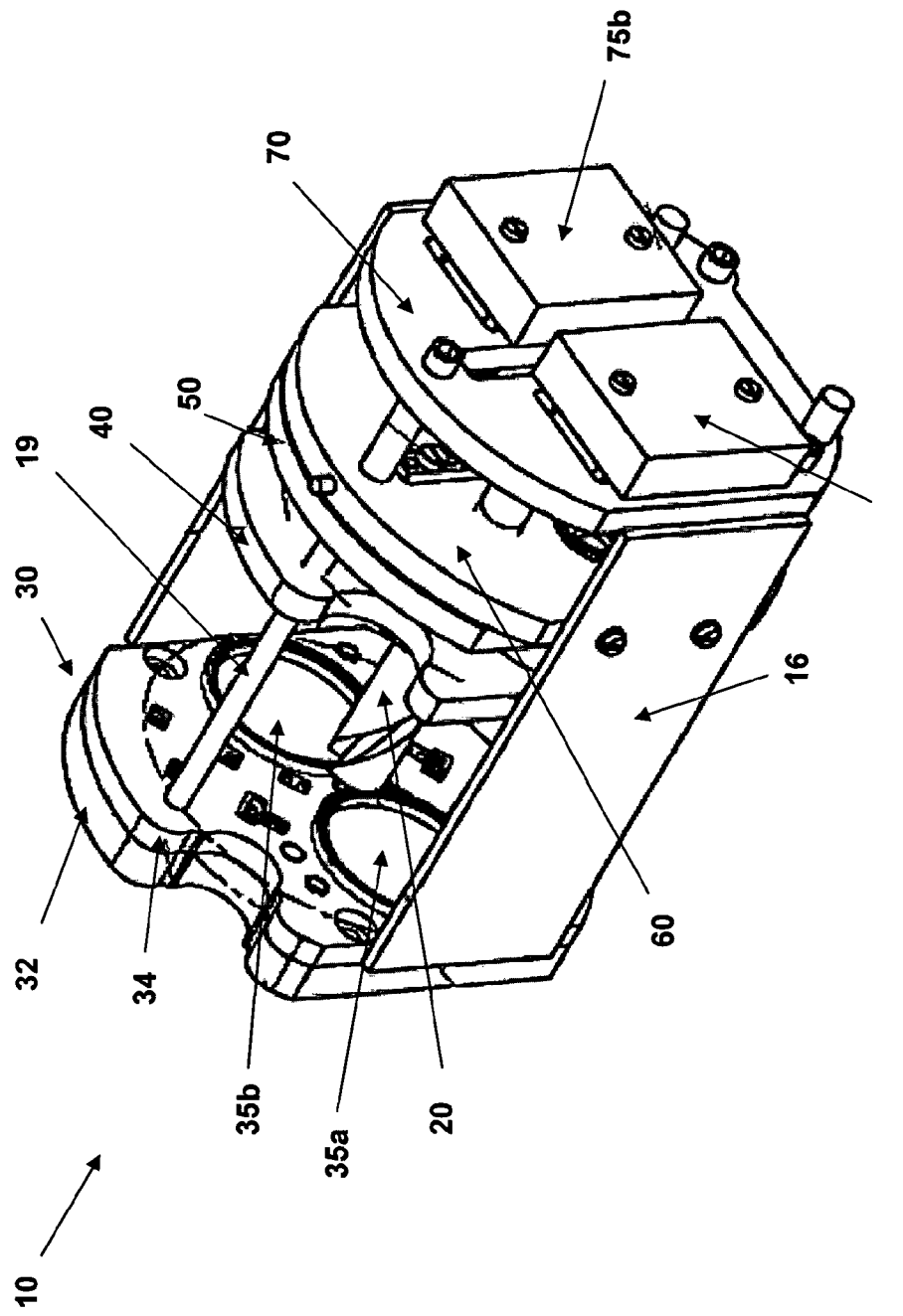
FIG. 1 shows a perspective view of a preferred embodiment of a zoom system according to the present invention.

A preferred embodiment of a zoom system 10 for an optical stereo device, such as a stereo microscope or a stereo camera, and the components thereof are shown in FIGS. 1 to 6. The zoom system 10 provides for two optical paths for light entering the zoom system 10 through the lens assemblies 35a and 35b of the front plate 30 and being detected by optical detectors 75a and 75b mounted to a detector or rear plate 70 (see FIGS. 1 and 2). As will be discussed in more detail further below, the front plate preferably is a composite front plate 30. The optical detectors 75a and 75b could be CCD or CMOS devices for electronically acquiring and storing images, which, as the person skilled in the art is well aware of, can be read out and processed by means of a control unit, such as a CPU. Alternatively, in case the zoom system according to the present invention is employed within a stereo microscope the optical detectors 75a and 75b could be replaced by suitably arranged and configured eye-pieces.

As the person skilled in the art of pancreatic lens systems is well aware of, further lens assemblies are provided along the optical axis of each optical path of the zoom system 10, namely respective lens assemblies 45a, 45b in the zoom plate 40, respective lens assemblies 55a, 55b in the compensation plate 50 and respective lens assemblies in the lens plate 60, which will be described in turn in more detail below. These respective lens assemblies can comprise one or more lenses arranged and configured to provide for a pancreatic system. As pancreatic systems are well known to the person skilled in the art, the respective lens assemblies will not be described in greater detail herein.

The zoom provided by the zoom system 10 according to the present invention essentially depends on the adjustable position of the zoom plate 40 relative to the composite front plate 30, the lens plate 60 and the detector plate 70 including the optical detectors 75a and 75b. The position of the composite front plate 30, the lens plate 60 and optionally the detector plate 70 relative to one another is fixed, because these plates are mounted to several longitudinally extending support or guiding bars (one of which is designated in FIGS. 1 and 2 with the reference sign 19). In the position of the zoom plate 40 shown in FIGS. 1 and 2, i.e. the zoom plate 40 being positioned in the immediate vicinity of the compensation plate 50, the zoom system 10 according to the present invention provides for the smallest zoom factor, whereas in the position of the zoom plate 40 in the immediate vicinity of the composite front plate 30 (i.e. to the left in FIGS. 1 and 2) the zoom system 10 provides for the largest zoom factor. Preferably, the ratio of the smallest to the largest zoom factor is about 1:10.

Figure 2:
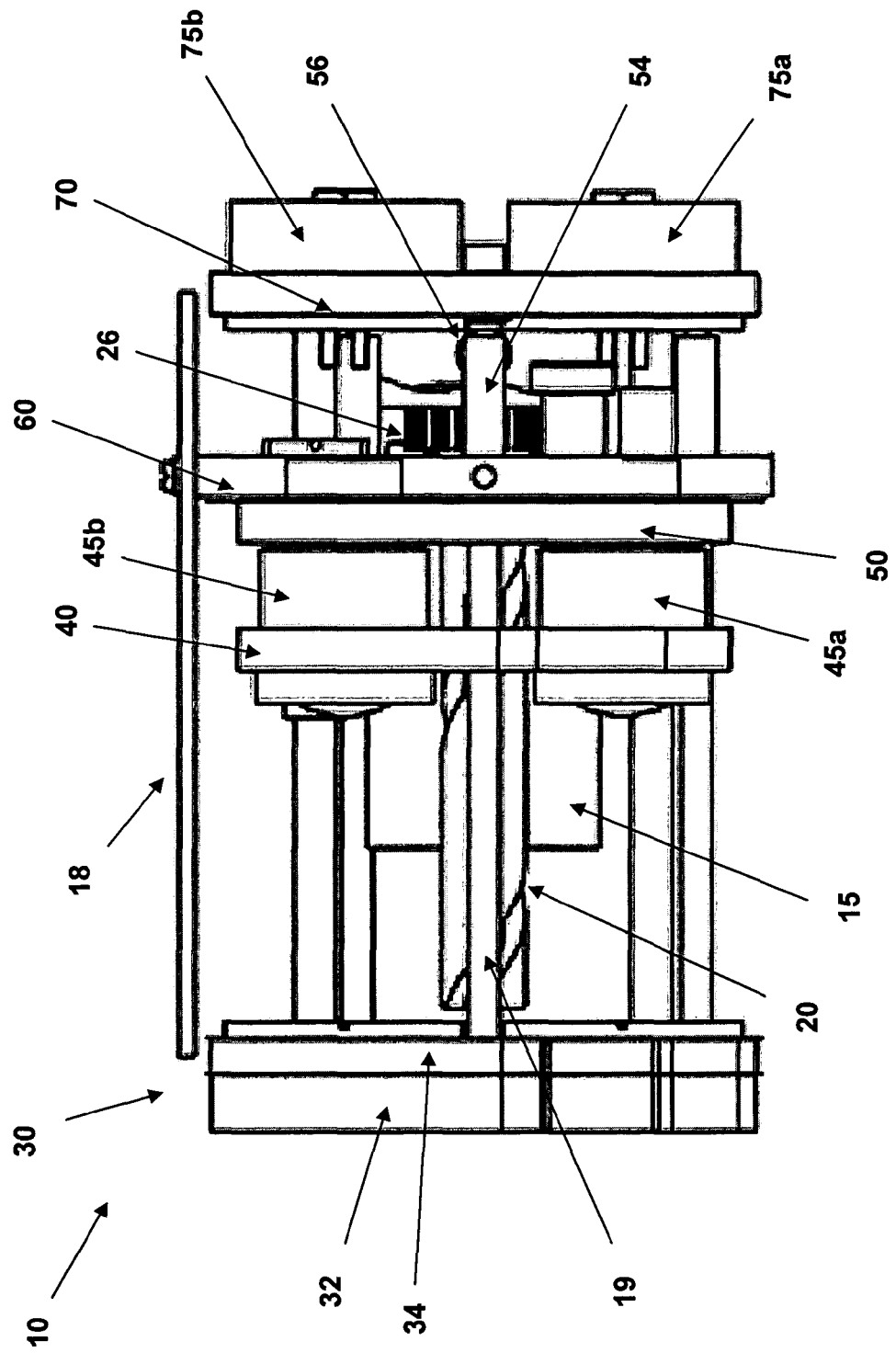
FIG. 2 shows a top plan view of the zoom system of FIG. 1.

As the person skilled in the art will appreciate, the zoom is adjusted by moving the zoom plate 40 closer to (larger zoom factor) or further away (smaller zoom factor) from the composite front plate 30 shown on the left hand side of FIGS. 1 and 2. This motion of the zoom plate 40 relative to the fixed spatial relationship between the composite front plate 30, the lens plate 60 and optionally the detector plate 70 is effected according to the present invention by means of a longitudinally extending rotatable drive spindle 20 interacting with the zoom plate 40. The drive spindle 20 can be rotated by a gear wheel mounted to the drive shaft (not shown) of a motor 15, wherein the gear wheel of the motor 15 engages and rotates a gear wheel portion 26 of the drive spindle 20 provided near one end thereof (see FIGS. 2 and 3). By means of an alignment pin 25 inserted in a spindle bearing 36 provided in the back side of the composite front plate 30 the drive spindle 20 is rotatably fixed relative to the composite front plate 30, the lens plate 60 and optionally the detector plate 70. As the motor 15 is energized and the drive shaft thereof is being rotated, this rotational motion translates into a rotation of the drive spindle 20 due to the interaction between the gear wheel mounted to the drive shaft of the motor 15 and the gear wheel portion 26 of the drive spindle 20.

Figure 5B:
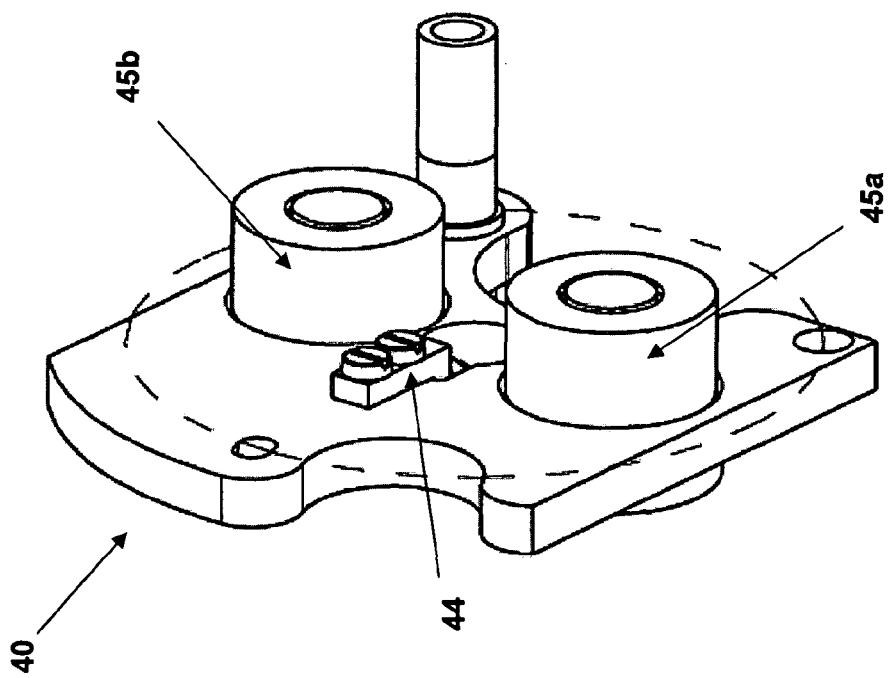
FIGS. 5a and 5b show perspective views of the front side of the zoom plate of the zoom system according to the present invention and the back side thereof, respectively, including a roller element rotatably mounted to a support element for interacting with the helical groove of the drive spindle of FIG. 3.
Figure 5A:
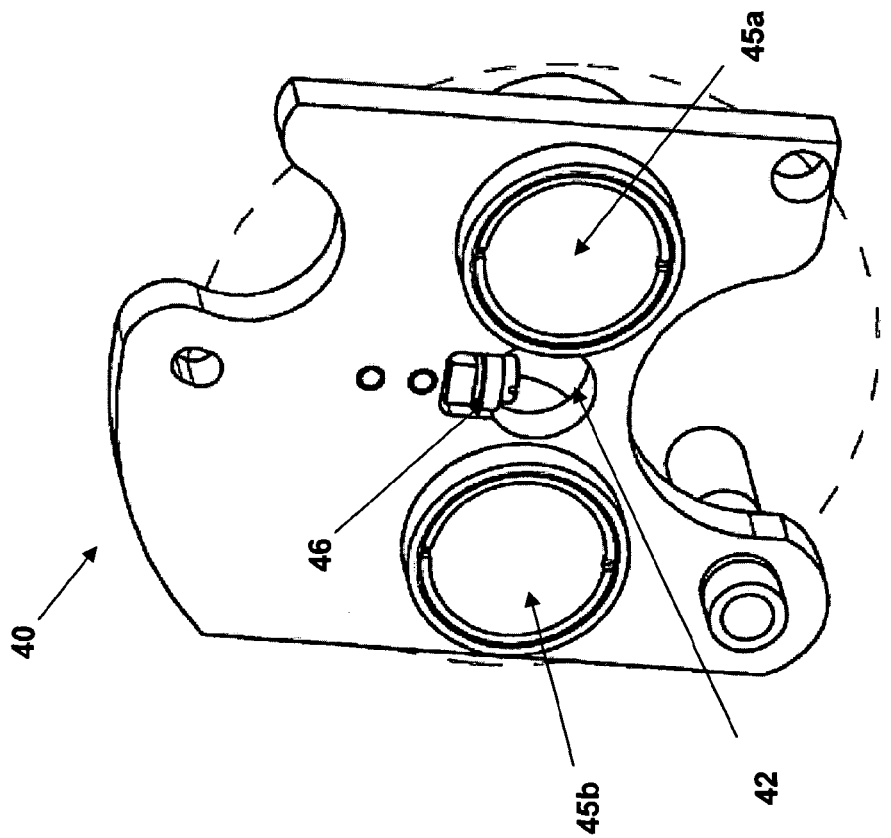

As can be taken in particular from FIGS. 5a and 5b, the zoom plate 40 is provided with a central opening 42, through which the substantially cylindrical longitudinally extending body portion 22 (see FIG. 3) of the drive spindle 20 is guided, such that the drive spindle 20 can rotate freely within said central opening 42 of the zoom plate 40. At one side edge of the central opening 42 of the zoom plate 40 a recess is provided for allowing a support or transmission element 44 mounted to the back side of the zoom plate 40 to pass therethrough. At one end of the support element 44 a roller element 46 is attached and rotatably supported, such as by means of a screw. The support element 44 and the roller element 46 attached thereto are arranged within the recess such that the roller element 46 extends into the central opening 42 of the zoom plate 40. The roller element 46 is sized to fit snugly, yet rotatably within a helical groove 24 (see FIG. 3) provided in the cylindrical body portion 22 of the drive spindle 20.

As the person skilled in the art will appreciate, this arrangement of the roller element 46 connected by means of the support element 44 to the zoom plate 40 relative to the helical groove 24 of the drive spindle 20 will lead to a translational motion of the zoom plate 40 relative to the composite front plate 30, the lens plate 60 and optionally the detector plate 70, as the motor 15 effects a rotational motion of the drive spindle 20 in clockwise or counter-clockwise direction.

In order to provide for a correct angular alignment of the movable zoom plate 40 further openings can be provided in the zoom plate 40, through which one or more of the longitudinal extending guide bars are inserted, such as guide bar 19, which fixedly connect the composite front plate 30, the lens plate 60 and optionally the detector plate 70.

It is well known that in a pancreatic system a focus compensation is required for different positions of the zoom plate 40 in order to provide for a good image. To this end, the zoom system 10 according to the present invention, furthermore, comprises a movable compensation plate 50 disposed between the zoom plate 40 and lens plate 60. Depending on the position of the zoom plate 40 the position of the compensation plate 50 relative to the fixed spatial orientation between the composite front plate 30, the lens plate 60 and optionally the detector plate 70 has to be adjusted. As in the case of the zoom plate 40 also the compensation plate 50 is provided with a central opening 52 through which the substantially cylindrical longitudinally extending body portion 22 (see FIG. 3) of the drive spindle 20 is guided, such that the drive spindle 20 can rotate freely within said central opening 52 of the compensation plate 50.

Figure 6:
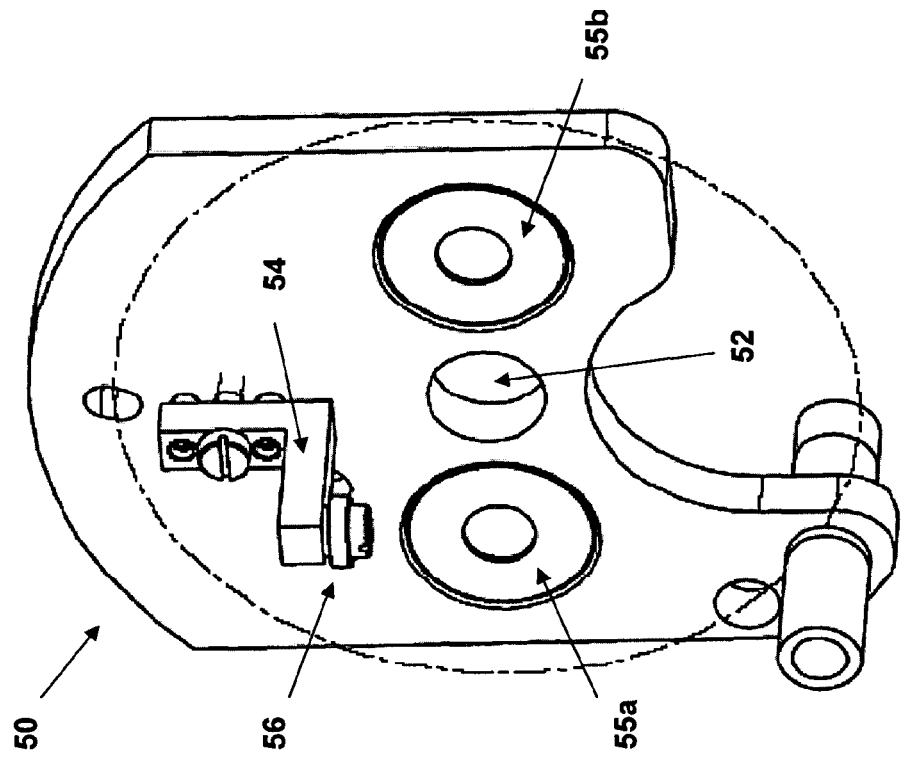
FIG. 6 shows a perspective view of the back side of the compensation plate of the zoom system of FIG. 1, including a roller element rotatably mounted to a support element for interacting with the cam disk portion of the drive spindle of FIG. 3.

In order to provide for the coordinated adjustment of the position of the compensation plate 50 in harmony with the change of the position of the zoom plate 40, also the compensation plate 50 comprises a support or transmission element 54 and a roller element or cam follower 56 suitably mounted to the back side thereof (see FIG. 6). As can be taken in particular from FIG. 2, the support element 54 and the roller element 56 attached to one end thereof are arranged on the back side of the compensation plate 50 and configured such that the support element 54 can be guided through a correspondingly shaped opening (not shown) in the lens plate 60 and such that the roller element 56 rotatably engages an cam disk portion 28 provided at the rear end of the drive spindle 20 (see FIG. 3).

As the drive spindle 20 is rotated by means of the motor 15, the roller element 56 will run on the upper surface of the cam disk portion 28 so that depending on the slope of the cam disk portion 28 a translational motion of the compensation plate 50 along the longitudinal axis of the zoom system 10 according to the present invention will be effected. In order to keep the roller element 56 in an abutting relationship with the upper surface of the cam disk portion 28 of the drive spindle 20 the compensation plate 50 can be biased in the direction of the zoom plate 40 by suitable biasing means, such as spring elements.

In order to provide for a correct angular alignment of the positional adjustable compensation plate 50 further openings can be provided in the compensation plate 50, through which one or more of the longitudinal extending guide bars are inserted, such as guide bar 19, which connect the composite front plate 30, the lens plate 60 and optionally the detector plate 70 and fix the spatial relationship between these plates.

Figure 4:
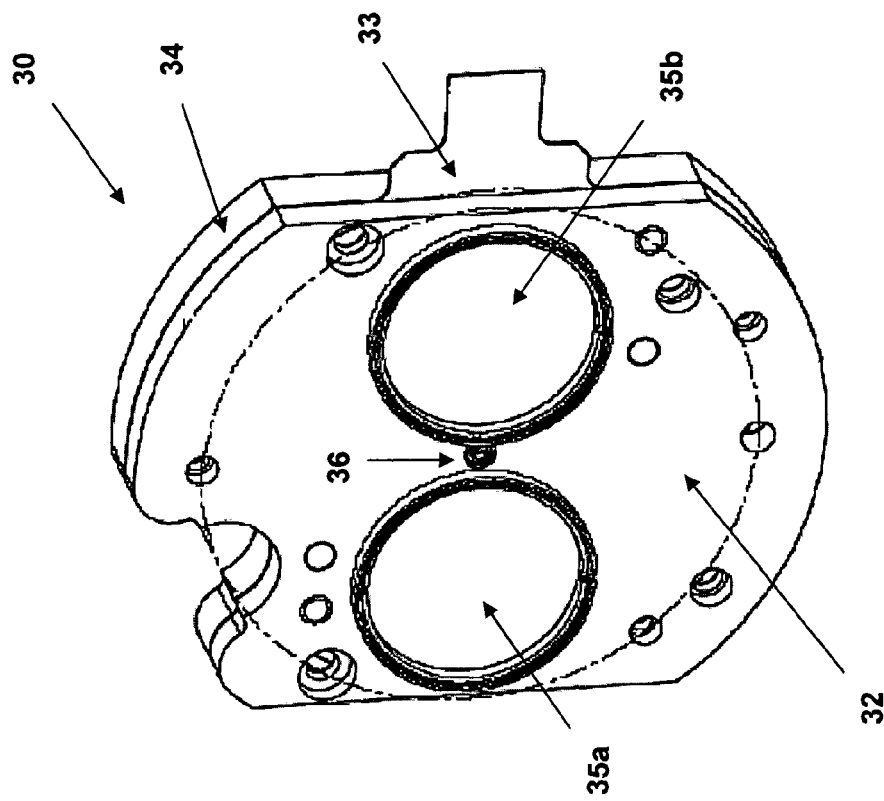
FIG. 4 shows a perspective view of the back side of a composite front plate of a preferred embodiment of a zoom system according to the present invention, wherein a flexible support foil is sandwiched between the elements of the composite front plate.
Figure 3:
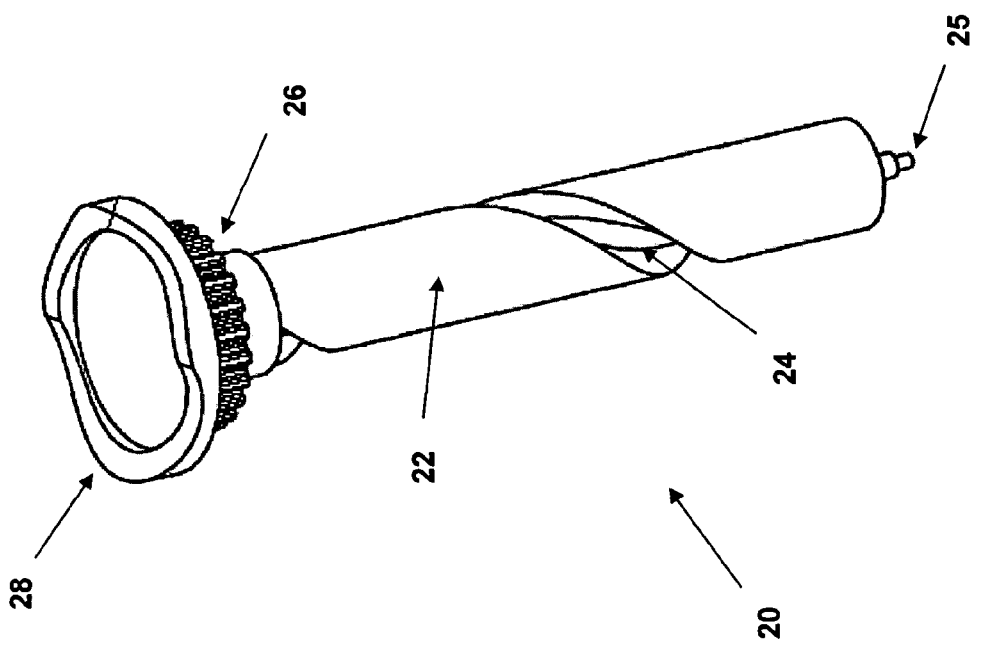
FIG. 3 shows a perspective view of the drive spindle of the zoom system of FIG. 1 for positioning specific lenses thereof in a controlled manner, including a gear wheel portion and a cam disk portion at one end thereof and a helical groove running along a cylindrical body portion thereof.
Figure 4B:
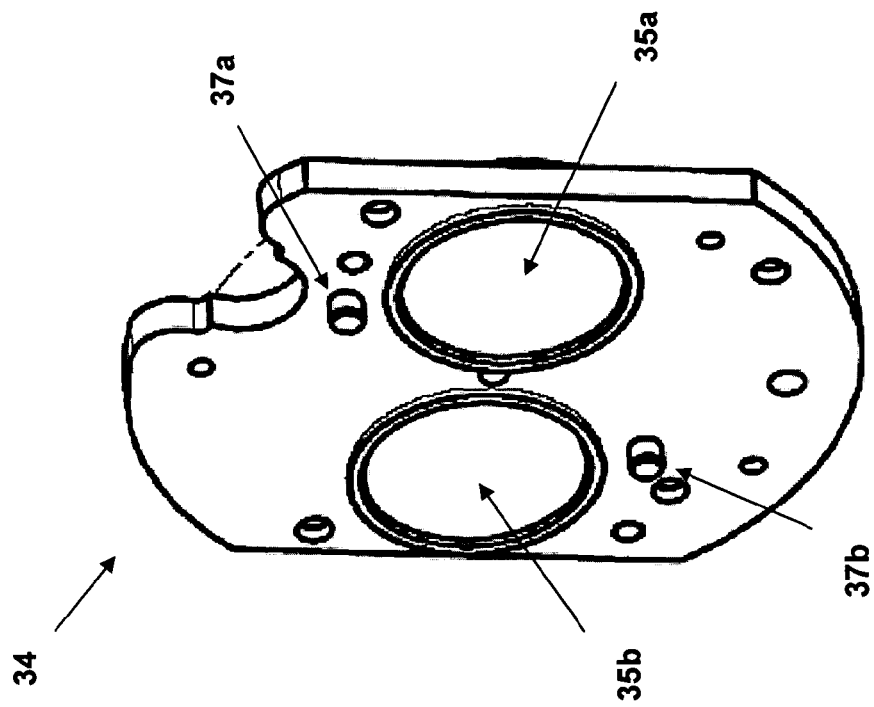
FIGS. 4a, 4b and 4c show perspective views of the front side of the first plate element of the composite front plate, the front side of the second plate element of the composite front plate, and the back side of the flexible support foil, respectively.
Figure 4A:
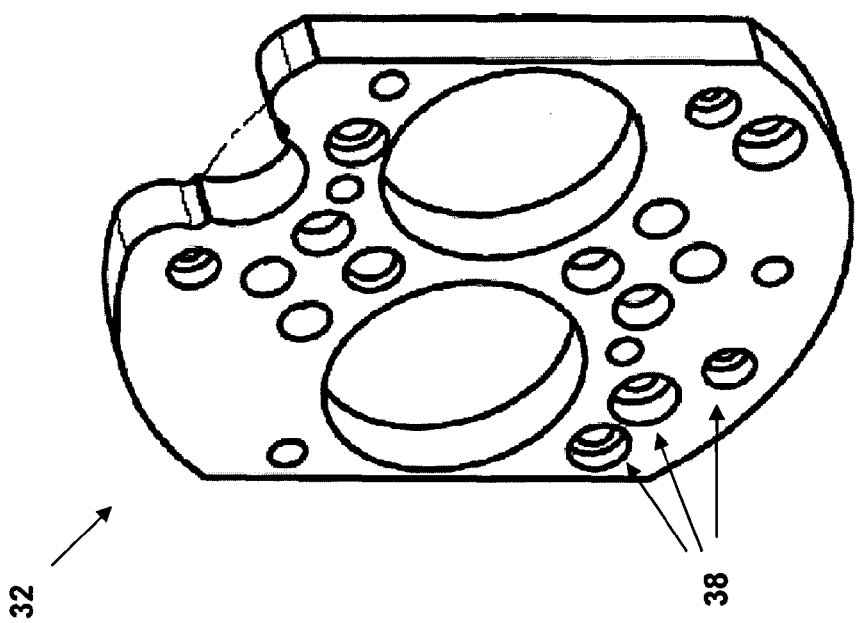
Figure 4C:
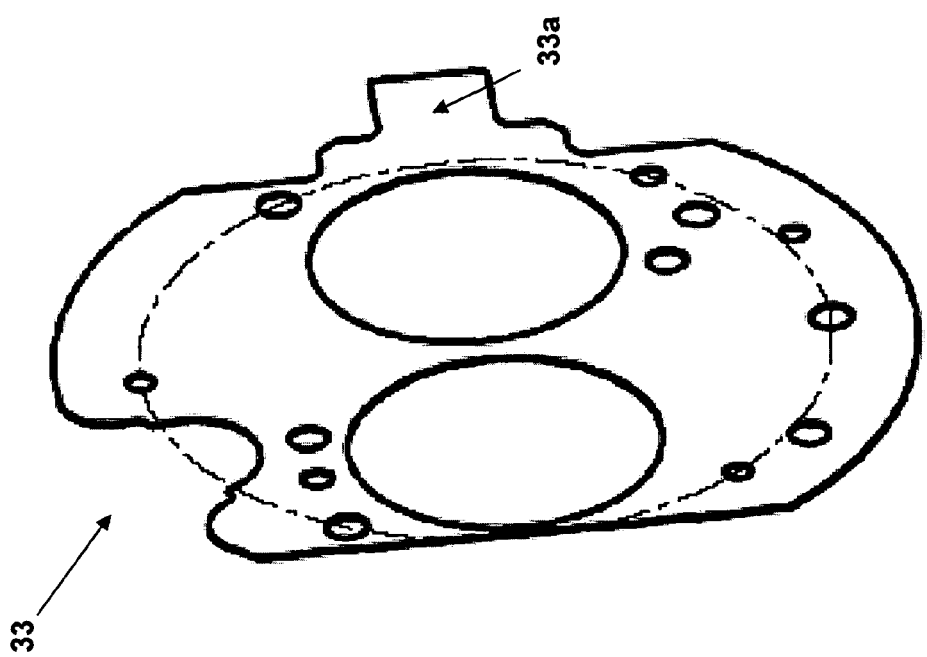

According to a further aspect of the invention the composite front plate 30 of the zoom system 10 according to the present invention comprises a first rigid plate element 32 and a second rigid plate element 34, as can be taken in particular from FIGS. 4, 4a and 4b. The lens assemblies 35a and 35b can be provided in the second rigid plate element 34, which, furthermore, can comprise securing pins 37a and 37b on the front side thereof for securing the second rigid plate element 34 to the first rigid plate element 32 by inserting the securing pins 37a and 37b of the second rigid plate element 34 into correspondingly shaped recesses provided on the back side of the first rigid plate element 32. As can be taken from FIGS. 4 and 4c a thin flexible support foil 33 can be sandwiched between the first rigid plate element 32 and the second rigid plate element 34. The flexible support foil 33 comprises suitable arranged and configured openings for allowing the passage of the lens assemblies 35a and 35b and the securing pins 37a and 37b therethrough, when the second rigid plate element 34 is secured to the first rigid plate element 32.

As can be taken from FIG. 4a, the first rigid plate element 32 preferably comprises a plurality of openings, such as openings 38. The openings 38 are respectively configured to receive a light emitting diode (LED) and a lens for focussing the light emitted by the LED onto the field of view being imaged. Preferably, the LEDs are provided as surface mounted devices (SMDs) which are suitably mounted or bonded to the flexible support foil 33. The LEDs can be energized by suitable power supply lines provided by the flexible support foil 33. These power supply lines can lead to a plug portion 33a of the flexible support foil 33 (see FIG. 4c), which can be inserted into a corresponding socket connected to a control and power supply circuitry of the zoom system 10 according to the present invention. The control and power supply circuitry of the zoom system 10 according to the present invention can be mounted, for instance, on the first and/or second side cover 16, 18 of the zoom system 10. Preferably, the first plate element 32 and the second plate element 34 are made of metal, such as aluminum, for allowing the removal of excess heat created by the LEDs.

In certain medical applications plastic materials are used, such as dental fillings, which are sensitive with respect to light. These plastic materials should not cure too rapidly during the insertion of the filling into the tooth. According to the present invention preferably LEDs can be employed in the composite front plate 30 which emit white light, yellow light or blue light. The composite front plate 30 can comprise only white LEDs, white and yellow LEDs, white and blue LEDs, yellow and blue LEDs or white, yellow and blue LEDs. With an arrangement comprising white and yellow LEDs it is possible to provide only yellow light, e.g. for a less rapid curing of a dental filling, by simply switching the white LEDs off and turning only the yellow LEDs on. The person skilled in the art will appreciate that to this end the LEDs provided by the composite front plate 30 preferably can be controlled and driven by the appropriately configured control and power circuitry mentioned above.

After a plastic dental filling has been provided the filling is irradiated with blue light in order to accelerate the curing thereof. According to the present invention, this can be easily achieved by means of the composite front plate 30 comprising blue LEDs. As in the case with yellow light, blue light can be provided by turning on only the blue LEDs and turning off the LEDs having different colours, e.g. white LEDs and/or yellow LEDs.

According to a still further aspect of the present invention the optical detectors 75a and 75b are mounted to the detector plate 70 in such a way that it is possible to adjust the position of the optical detectors 75a and 75b with respect to the detector plate 70 and/or the lens plate 60 in x, y and z-direction to allow for additional optical corrections.

The present invention as described in detail above is not limited to the particular devices, uses and methodology described as these may vary. It is also to be understood that the terminology used herein is for the purpose of describing particular embodiments only, and is not intended to limit the scope of the present invention which will be limited only by the appended claims. Unless defined otherwise, all technical and scientific terms used herein have the same meanings as commonly understood by one of ordinary skill in the art.

The invention claimed is:

1. Zoom system for an optical stereo device, comprising:
a front plate having two lens assemblies;
a lens plate having two lens assemblies, wherein the front plate and the lens plate are disposed in a fixed spatial relationship and define two optical paths within the zoom system;
a zoom plate having two lens assemblies, wherein the zoom plate is disposed between the front plate and the lens plate;
a compensation plate having two lens assemblies, wherein the compensation plate is disposed between the zoom plate and the lens plate; and
a drive spindle having a helical groove and a cam disk portion for simultaneously adjusting the position of the zoom plate and the compensation plate relative to the front plate and the lens plate in a coordinated manner, wherein the position of the zoom plate is adjusted by means of the helical groove and the position of the compensation plate is adjusted by means of the cam disk portion of the drive spindle.

2. System according to claim 1, wherein the zoom plate further comprises a central opening through which the drive spindle is guided, a support element and a roller element, wherein the roller element extends into the central opening and is sized to fit within the helical groove of the drive spindle, such that a rotational movement of the drive spindle effects a translational movement of the zoom plate relative to the front plate and the lens plate.

3. System according to claim 1, wherein the compensation plate further comprises a central opening through which the drive spindle is guided, a support element and a roller element, wherein the support element is guided through a correspondingly shaped opening in the lens plate and wherein the roller element rotatably engages the cam disk portion of the drive spindle, such that a rotational movement of the drive spindle effects a translational movement of the compensation plate relative to the front plate and the lens plate.

4. System according to claim 3, wherein the compensation plate further comprises biasing means for biasing the roller element into an abutting relationship with the cam disk portion of the drive spindle.

5. System according to claim 1, wherein the drive spindle can be rotated by means of a gear wheel mounted to the drive shaft of a motor, wherein the gear wheel of the motor engages and rotates a gear wheel portion of the drive spindle.

6. System according to claim 1, wherein the drive spindle is supported by an alignment pin received within a spindle bearing provided in the back side of the front plate.

7. System according to claim 1, further comprising a detector plate with two optical detectors for detecting light propagating substantially along the two optical paths of the zoom system.

8. System according to claim 7, wherein the optical detectors are CCD or CMOS devices.

9. System according to claim 7, wherein the respective positions of the optical detectors can be adjusted relative to the detector plate and/or the lens plate in x, y, and z direction.

10. System according to claim 1, wherein the front plate and the lens plate are disposed in a fixed spatial relationship by means of at least one support bar.

11. System according to claim 1, wherein the front plate is a composite front plate comprising a first plate element and a second plate element.

12. System according to claim 11, wherein a thin flexible support foil is sandwiched between the first plate element and the second plate element.

13. System according to claim 12, wherein a plurality of openings are provided in the first plate element for receiving a corresponding plurality of LEDs and lenses.

14. System according to claim 13, wherein the LEDs are surface mounted devices mounted on the flexible support foil, wherein the LEDs can be energized and controlled by power supply lines provided by the flexible support foil.

15. System according to claim 14, wherein the LEDs emit white light, yellow light and/or blue light.

* * * * *